US012646855B2

(12) United States Patent
Kaminski et al.

(10) Patent No.: US 12,646,855 B2
(45) Date of Patent: Jun. 2, 2026

(54) ANTENNA ELEMENT AND ANTENNA ARRAY

(71) Applicants: Airbus (S.A.S.), Blagnac Cedex (FR); Airbus Operations Limited, Filton (GB)

(72) Inventors: Piotr Kaminski, Hamburg (DE); Yoann Thueux, Bristol (GB)

(73) Assignees: Airbus (S.A.S.), Blagnac (FR); Airbus Operations Limited, Filton (GB)

( * ) Notice: Subject to any disclaimer, the term of this patent is extended or adjusted under 35 U.S.C. 154(b) by 53 days.

(21) Appl. No.: 18/655,585

(22) Filed: May 6, 2024

(65) Prior Publication Data

US 2024/0380119 A1 Nov. 14, 2024

(30) Foreign Application Priority Data

May 8, 2023 (EP) .................................... 23172064

(51) Int. Cl.
*H01Q 15/00* (2006.01)
*H01Q 21/06* (2006.01)

(52) U.S. Cl.
CPC ....... *H01Q 15/0086* (2013.01); *H01Q 21/061* (2013.01)

(58) Field of Classification Search
CPC ............ H01Q 1/08; H01Q 1/285; H01Q 1/38; H01Q 9/0407; H01Q 15/0086; H01Q 21/00; H01Q 21/0025; H01Q 21/061; H01Q 21/065
See application file for complete search history.

(56) References Cited

U.S. PATENT DOCUMENTS

| | | | |
|---|---|---|---|
| 6,091,367 | A | 7/2000 | Kabashima |
| 2022/0384954 | A1 | 12/2022 | Moon |

FOREIGN PATENT DOCUMENTS

| | | | | | |
|---|---|---|---|---|---|
| CN | 112768911 | A | | 5/2021 | |
| CN | 114914698 | A | | 8/2022 | |
| WO | WO-2023060557 | A1 | * | 4/2023 | ........... H01Q 21/065 |

OTHER PUBLICATIONS

Moussessian Alina et al, “Architectural study of active membrane antennas,” 2002 9th International Symposium on Antenna Techonl-ogy and Applied Electromagnetics, IEEE, Jul. 31, 2002, pp. 1-4.
Komsan Kanjanaset et al, “A high directivity broadband aperture coupled patch antenna using a metamaterial based superstrate,” Antennas and Propagation Conference, Nov. 12, 2012, pp. 1-4.
European Search Report for Application No. 231720640 dated Oct. 24, 2023.

* cited by examiner

*Primary Examiner* — Hoang V Nguyen
(74) *Attorney, Agent, or Firm* — KDW Firm PLLC

(57) ABSTRACT

An antenna element includes a first thin-film membrane, second thin-film membrane essentially parallel to and spaced apart from the first thin-film membrane, an electro-magnetic metasurface on a first side of the first thin-film membrane opposite of the second thin-film membrane, and a metallic coating on a first side of the second thin-film membrane opposite of the first thin-film membrane. An antenna array is also disclosed.

20 Claims, 3 Drawing Sheets

ANTENNA ELEMENT AND ANTENNA ARRAY

TECHNICAL FIELD

The disclosure herein is directed to an antenna element and an antenna array.

BACKGROUND

Layers consisting of usually periodic arrangements of subwavelength metallic inclusions in a dielectric host medium are referred to as metasurfaces. They can be designed to achieve unusual reflection/transmission properties of space waves and/or to modify the dispersion properties of surface/guided waves.

In theory, such metasurfaces could be used to create antennas for the wireless transmission of energy via electromagnetic waves. This could be especially beneficial in the aerospace field, where energy transmission by wires is often not feasible, for example in order to power aircraft or even for satellites designed to collect solar power and transmit that power to Earth.

However, the use of dielectric substrates in metasurface antennas limits their suitability for aerospace application, where weight and space requirements are often prohibitive.

SUMMARY

In view of the above, it is an objective of the disclosure herein to provide antennas, in particular for the wireless transmission of energy, which have reduced weight, in particular for applications in space.

This objective is achieved by an antenna element and an antenna array as disclosed herein.

According to a first aspect of the disclosure herein, an antenna element comprising a first thin-film membrane, second thin-film membrane arranged essentially parallel to and spaced apart from the first thin-film membrane, an electromagnetic metasurface arranged on a first side of the first thin-film membrane opposite of the second thin-film membrane, and a metallic coating arranged on a first side of the second thin-film membrane opposite of the first thin-film membrane, is provided.

According to a further aspect of the disclosure herein, an antenna array comprising a mounting device and a plurality of antenna elements according to the first aspect of the disclosure herein is provided. The plurality of antenna elements are attached to the mounting device.

It is an idea of the disclosure herein to combine thin-film membranes and a metasurface in order to create an antenna, which can receive and emit radiation, depending on the specific embodiment, in particular for the purpose of wireless transmission of energy. This allows for a particularly light-weight antenna, which in turn allows the wireless transmission of energy in scenarios where conventional antennas used for the wireless transmission of energy might be not suited.

According to a preferred embodiment of the antenna element, the electromagnetic metasurface comprises a feeding mechanism, which is configured to induce an emission of electromagnetic waves from the electromagnetic metasurface. In this way, the antenna element can be advantageously used for emitting electromagnetic radiation.

According an embodiment of the disclosure herein, the antenna element further comprises at least one third thin-film membrane arranged essentially parallel and spaced apart from the first thin-film membrane and the second thin-film membrane. These additional thin-film membranes can be advantageously used to adapt the antenna array to various purposes.

According to a further embodiment of the antenna element, the at least one third thin-film membrane is arranged on a side of the first thin-film membrane opposite to the second thin-film membrane. This can advantageously improve the electrical properties of the antenna element.

According to a further embodiment of the antenna element, the at least one third thin-film membrane is arranged on a side of the second thin-film membrane opposite to the first thin-film membrane. This can advantageously allow the implementation of various feeding mechanisms.

According to a further embodiment of the disclosure herein, the antenna element is configured to be foldable. This advantageously reduces the space requirements of the antenna element, in particular during deployment for use in space.

According to a further embodiment of the antenna element, the electromagnetic metasurface is configured to receive and/or emit microwave radiation. This wavelength range is particularly advantageous for the wireless transmission of energy over long distances.

According to a further embodiment, the antenna element further comprises a frame, wherein the first thin-film membrane and the second thin-film membrane are attached to the frame. This advantageously increases the stability of the antenna element.

According to a further embodiment, the frame comprises a form suited for regular tiling. This allows the antenna element to be used to efficiently cover a surface when used in multiples.

According to a further embodiment, the frame comprises a hexagonal form or a square form. This are particularly simple examples of forms used for regular tiling.

According to a further embodiment, the frame is configured to connect to a frame of an adjacent identical antenna element. This is particularly advantageous when deploying multiple antenna elements in conjunction.

According to a further embodiment of the antenna array, the mounting device is configured to be foldable. This advantageously reduces the space requirements of the antenna array, in particular during deployment for use in space.

According to a further embodiment of the antenna array, the mounting device comprises a frame structure which defines a planar area. This advantageously increases the stability of the antenna array.

According to a further embodiment, the plurality of antenna elements cover substantially the entirety of the planar area. This advantageously increases the efficiency of the antenna array per surface.

BRIEF DESCRIPTION OF THE DRAWINGS

The disclosure herein is explained in more detail below with reference to the embodiments shown in the schematic figures.

Figure 1:
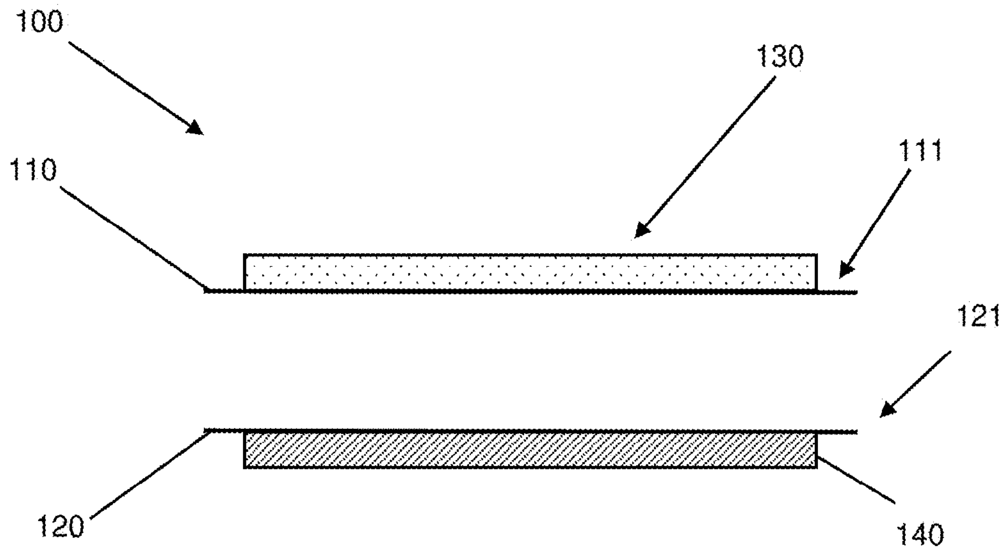
FIG. 1 shows a schematic cross-sectional view of an antenna element according to an embodiment of the disclosure herein.

In the figures of the drawing, elements, features and components which are identical, functionally identical and of identical action are denoted in each case by the same reference designations unless stated otherwise.

DETAILED DESCRIPTION

FIG. 1 shows a schematic cross-sectional view of an antenna element 100 according to an embodiment of the disclosure herein.

The antenna element 100 comprises a first thin-film membrane 110, a second thin-film membrane 120, an electromagnetic metasurface 130, and a metallic coating 140. The second thin-film membrane 120 is arranged essentially parallel to and spaced apart from the first thin-film membrane 110. The electromagnetic metasurface 130 is arranged on a first side 111 of the first thin-film membrane 110 opposite of the second thin-film membrane 120. The metallic coating 140 is arranged on a first side 121 of the second thin-film membrane 120 opposite of the first thin-film membrane 110.

The first thin-film layer 110 and the second thin-film layer 120 are separated from each other, the space between them filled either by air or any other atmosphere the antenna element is used in, or by vacuum, if the antenna element is used in space. In both cases, the thin-film layers 110 and 120 and the space between serve as the dielectric medium between the electromagnetic metasurface 130 and the metal coating 140 which serves as a grounding plate. This way, the antenna element 100 can receive electromagnetic radiation.

The thin-film membranes 110 and 120 are not further specified for this embodiment concerning their exact configurations and the materials used therein. The thin-film layer 110 and 120 can be configured in many ways depending on the specifics of the use-case for the antenna element 100. In a particularly preferred embodiment, the antenna element 100 may be configured to be foldable. This is particularly advantageous for applications in space, where components should be designed with minimum space requirements, in particular during deployment of for example a satellite.

The same way, the specifics of the design of the electromagnetic metasurface 130 are not presented in this embodiment, as there are many ways in which the electromagnetic metasurface 130 can be designed, depending on the use-case of the antenna element. In particular, the sizes, arrangements and materials used for the elements which make up the metasurface can be chosen according to the desired properties of the antenna element 100. In one particularly preferred embodiment, the electromagnetic metasurface 130 may configured to receive and/or emit microwave radiation. This wavelength range is particularly suited for the wireless transfer of energy over long distances.

Figure 2:
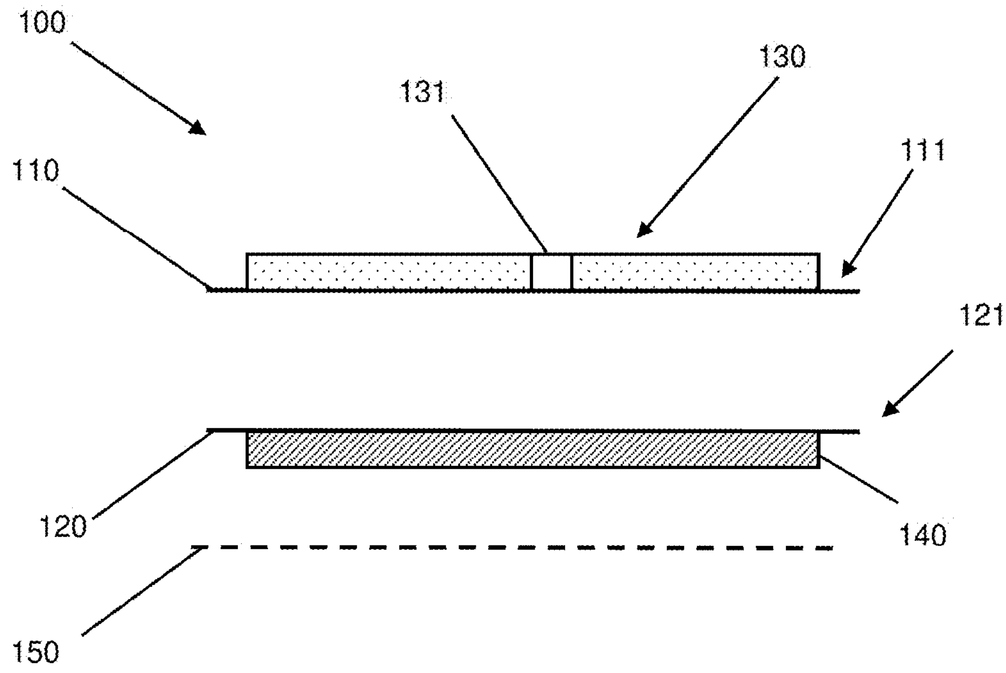
FIG. 2 shows a schematic cross-sectional view of an antenna element according to an embodiment of the disclosure herein.

FIG. 2 shows a schematic cross-sectional view of an antenna element 100 according to an embodiment of the disclosure herein.

The antenna element 100 comprises all features of the antenna element shown in FIG. 1. The electromagnetic metasurface 130 further comprises a feeding mechanism 131, which is configured to induce an emission of electromagnetic waves from the electromagnetic metasurface 130.

In this embodiment, the electromagnetic metasurface 130, induced by the feeding mechanism 131, can serve to emit electromagnetic radiation. It is not explicitly shown in FIG. 2, how the feeding mechanism 131 is configured in detail. FIG. 2 shows one singular mechanism which could be understood to work as a feeding pin, however other mechanisms, e.g. slots and the like, can also be provided.

An additional, optional third thin-film membrane 150 is shown in FIG. 2. The third thin-film membrane 150 is arranged essentially parallel to the first thin-film membrane 110 and the second thin-film membrane 120 on a side of the second thin-film membrane 120 opposite to the first thin-film membrane 110. In this way, the third thin-film membrane 150 can be useful for the implementation of various feeding mechanisms. The third thin-film membrane 150 could also be arranged on a side of the first thin-film membrane 110 opposite to the second thin-film membrane 120. Such a third thin-film membrane 150 could improve the electrical properties of the antenna element 100. Any number of third thin-film membranes 150 can be provided at both positions depending on the intended properties of the antenna element 100.

Figure 3:
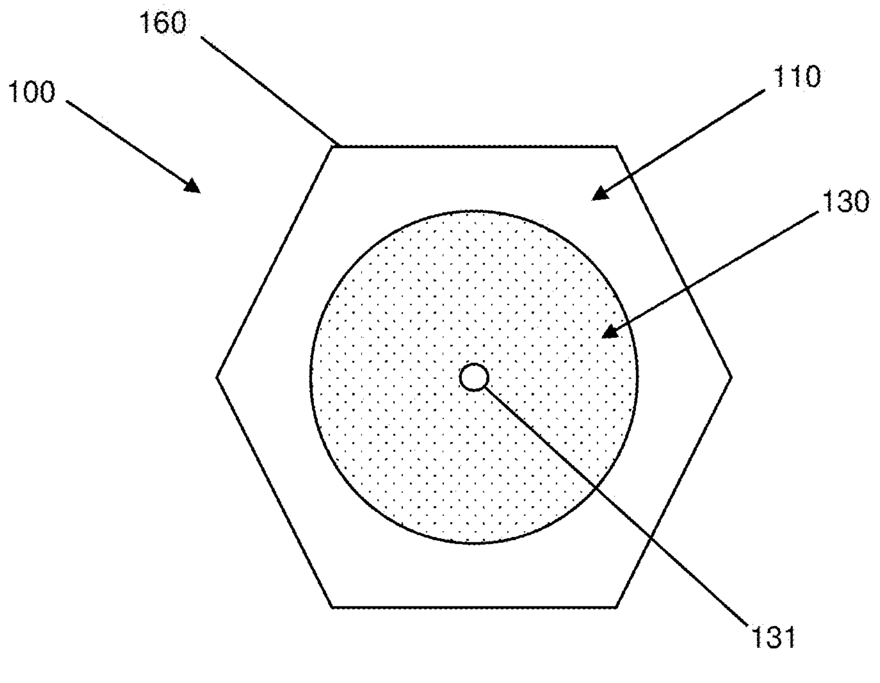
FIG. 3 shows a schematic top view of an antenna element according to an embodiment of the disclosure herein.

FIG. 3 shows a schematic top view of an antenna element 100 according to an embodiment of the disclosure herein.

The antenna element 100 is configured the same way as the antenna element shown in FIG. 2, wherein the first thin-film membrane 110, the electromagnetic metasurface 130 and the feeding mechanism 131 cane be seen in this view. The antenna element 100 further comprises a frame 150.

The first thin-film membrane 110 and the second thin-film membrane, which is not shown, are attached to the frame 150.

In the embodiment shown, the frame 150 comprises a hexagonal form. This is one particular example of a form suited for regular tiling. In this way, a plurality of antenna elements 100 can be arranged in a lattice which covers substantially all of a given surface, as is for example indicated in FIG. 3. Other forms can also be used for this effect, for example the frame 150 may also comprise a square form. In order to facilitate this arrangement, the frame 150 may also be configured to connect to a frame 150 of an adjacent identical antenna element 100.

Alternatively, the frame 150 may also comprise a circular shape, which might provide advantages with respect to the foldability of the antenna element 100.

The frame 150 may also be configured to be foldable.

Figure 4:
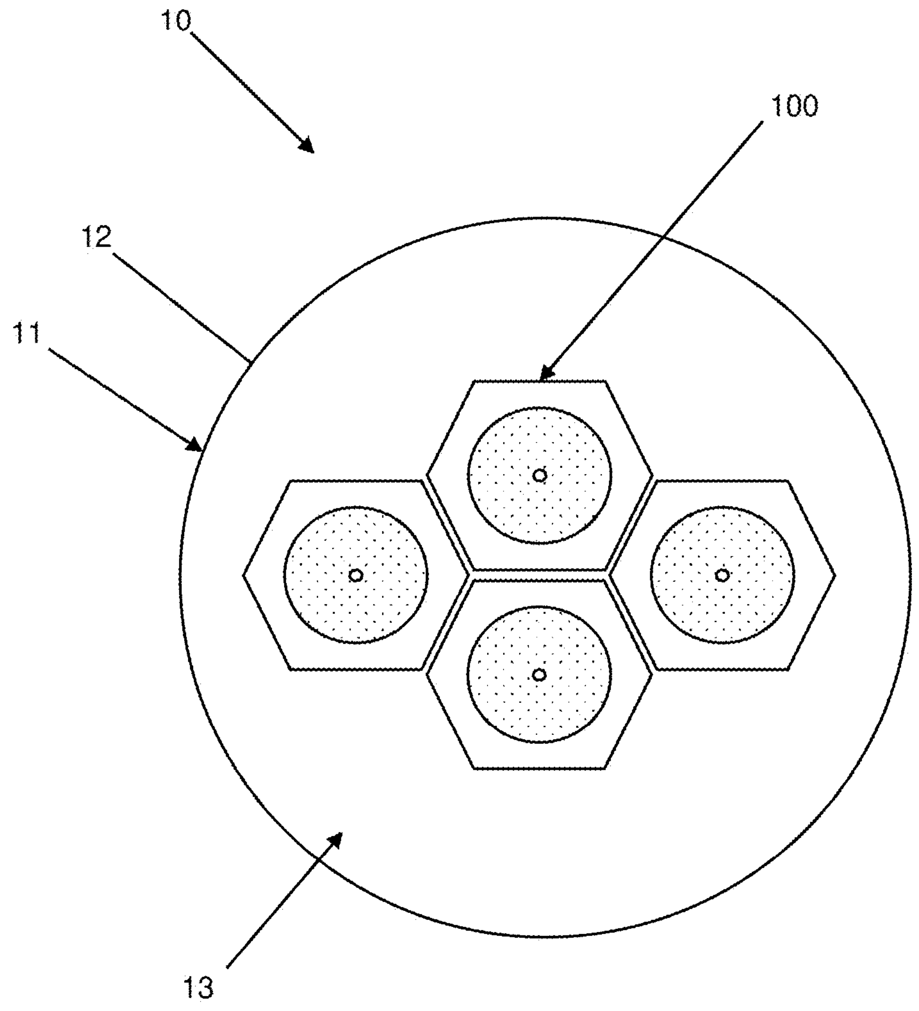
FIG. 4 shows a schematic top view of an antenna array according to an embodiment of the disclosure herein.

FIG. 4 shows a schematic top view of an antenna array 10 according to an embodiment of the disclosure herein.

The antenna array 10 comprises a mounting device 11 and a plurality of antenna elements 100. The plurality of antenna elements 100 are attached to the mounting device 11. The mounting device 11 shown in FIG. 4 comprises a circular frame structure 12 which defines a planar area 13.

The antenna elements 100 shown in FIG. 4 are configured the same way as the antenna element shown in FIG. 3. The plurality of antenna elements 100, of which four are shown in FIG. 4, form a regular lattice arranged within the planar area 13. In the embodiment shown, the plurality of antenna elements 100 does not cover the whole surface area of the planar are 13. This implies that the frame structure 12 comprises a mounting surface, which is not shown, to which the plurality of antenna elements 100 are attached. In cases where the plurality of antenna elements 100 are arranged to cover the entirety of the planar area 13, the plurality of antenna elements 100 might be attached directly to the frame structure 12, in particular in cases where the plurality of antenna elements 100 comprise frames which can be connected to one another.

The specifics of the mounting device 11, and in particular the frame structure 12 are not further defined for this embodiment, as there are many ways in which the mounting device 11 and frame structure 12 can be configured depending on the use-case of the antenna array 10. In particular the dimensions and materials used can be chosen according to the preferred properties of the antenna array 10. In a particularly preferred embodiment, the mounting device 11 may be configured to be foldable. This is particularly advantageous for applications in space, where components should be designed with minimum space requirements, in particular during deployment of for example a satellite. In particular, the mounting device 11 can be configured to unfold itself and the antenna elements 100 all at the same time.

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 antenna array
11 mounting device
12 frame structure
13 planar area
100 antenna element
110 first thin-film membrane
111 first side
120 second thin-film membrane
121 first side
130 electromagnetic metasurface
131 feeding mechanism
140 metallic coating

The invention claimed is:

1. An antenna element comprising:
a first thin-film membrane;
a second thin-film membrane essentially parallel to and spaced apart from the first thin-film membrane;
an electromagnetic metasurface on a first side of the first thin-film membrane, which is opposite from, and faces away from, the second thin-film membrane; and
a metallic coating on a first side of the second thin-film membrane, which is opposite from, and faces away from, the first thin-film membrane;
wherein the electromagnetic metasurface comprises at least one arrangement of subwavelength metallic inclusions in a dielectric host medium.

2. The antenna element according to claim 1, wherein the electromagnetic metasurface comprises a feeding mechanism, which is configured to induce an emission of electromagnetic waves from the electromagnetic metasurface.

3. The antenna element according to claim 1, comprising at least one third thin-film membrane, which is essentially parallel to and spaced apart from both the first thin-film membrane and the second thin-film membrane.

4. The antenna element according to claim 3, wherein the at least one third thin-film membrane is on a side of the first thin-film membrane that is opposite from, and faces away from, the second thin-film membrane.

5. The antenna element according to claim 3, wherein the at least one third thin-film membrane is on a side of the second thin-film membrane that is opposite from, and faces away from, the first thin-film membrane.

6. The antenna element according to claim 1, wherein the antenna element is foldable.

7. The antenna element according to claim 1, wherein the electromagnetic metasurface is configured to receive and/or emit microwave radiation.

8. The antenna element according to claim 1, comprising a frame, to which the first thin-film membrane and the second thin-film membrane are attached.

9. The antenna element according to claim 8, wherein the frame comprises a form suited for regular tiling.

10. The antenna element according to claim 9, wherein the form of the frame comprises a hexagonal form or a square form.

11. The antenna element according to claim 8, wherein the frame is configured to connect to a frame of an adjacent antenna element that is identical to the antenna element.

12. An antenna array comprising:
a mounting device; and
a plurality of the antenna elements according to claim 1, which are attached to the mounting device.

13. The antenna array according to claim 12, wherein the mounting device is configured to be foldable.

14. The antenna array according to claim 12, wherein the mounting device comprises a frame structure which defines a planar area.

15. The antenna array according to claim 14, wherein the plurality of antenna elements cover substantially an entirety of the planar area.

16. An antenna element comprising:
a first thin-film membrane;
a second thin-film membrane essentially parallel to and spaced apart from the first thin-film membrane;
a frame, to which the first thin-film membrane and the second thin-film membrane are attached;
at least one third thin-film membrane, which is essentially parallel to and spaced apart from both the first thin-film membrane and the second thin-film membrane;
an electromagnetic metasurface on a first side of the first thin-film membrane, which is opposite from, and faces away from, the second thin-film membrane; and
a metallic coating on a first side of the second thin-film membrane, which is opposite from, and faces away from, the first thin-film membrane;
wherein the electromagnetic metasurface comprises at least one arrangement of subwavelength metallic inclusions in a dielectric host medium;
wherein the electromagnetic metasurface comprises a feeding mechanism, which is configured to induce an emission of electromagnetic waves from the electromagnetic metasurface;
wherein the antenna element is foldable;
wherein the electromagnetic metasurface is configured to receive and/or emit microwave radiation;
wherein the frame comprises a form suited for regular tiling, the form being a hexagonal form or a square form; and
wherein the frame is configured to connect to a frame of an adjacent antenna element that is identical to the antenna element.

17. The antenna element according to claim 16, wherein the at least one third thin-film membrane is on a side of the first thin-film membrane that is opposite from, and faces away from, the second thin-film membrane.

18. The antenna element according to claim 16, wherein the at least one third thin-film membrane is on a side of the second thin-film membrane that is opposite from, and faces away from, the first thin-film membrane.

19. An antenna array comprising:

a mounting device; and a plurality of the antenna elements according to claim 16, which are attached to the mounting device.

20. The antenna array according to claim 19, wherein:

the mounting device is foldable;

the mounting device comprises a frame structure, which defines a planar area; and the plurality of antenna elements cover substantially an entirety of the planar area.

* * * * *